United States Patent [19]
Bruner

[11] 3,971,546
[45] July 27, 1976

[54] ANIMAL CROSSING GUARD

[76] Inventor: A. J. Bruner, 2166 Katherine St., Fort Myers, Fla. 33901

[22] Filed: Apr. 21, 1975

[21] Appl. No.: 569,702

[52] U.S. Cl. .............................................. 256/14
[51] Int. Cl.² ........................................ A01K 3/00
[58] Field of Search ................ 52/626; 256/14, 17; 248/42, 21, 22, 59

[56] References Cited
UNITED STATES PATENTS

| | | | |
|---|---|---|---|
| 1,751,014 | 3/1930 | Mobley | 248/42 |
| 3,384,352 | 5/1968 | Bruner | 256/14 |
| 3,471,182 | 10/1969 | Schroer | 256/21 |
| 3,493,202 | 2/1970 | Jensen | 248/42 |

*Primary Examiner*—Werner H. Schroeder
*Assistant Examiner*—Doris L. Troutman
*Attorney, Agent, or Firm*—Ulle C. Linton

[57] ABSTRACT

An animal crossing guard has a rectangular frame, bars extending across the frame at 45°, transverse members extending directly across the frame securing opposite frame members from spreading and supporting the bars intermediate their ends, and identical brackets bolted to the frame and overlapping each other to receive the ends of the bars mounting the bars and spacing them apart at regular intervals forming a grid.

5 Claims, 7 Drawing Figures

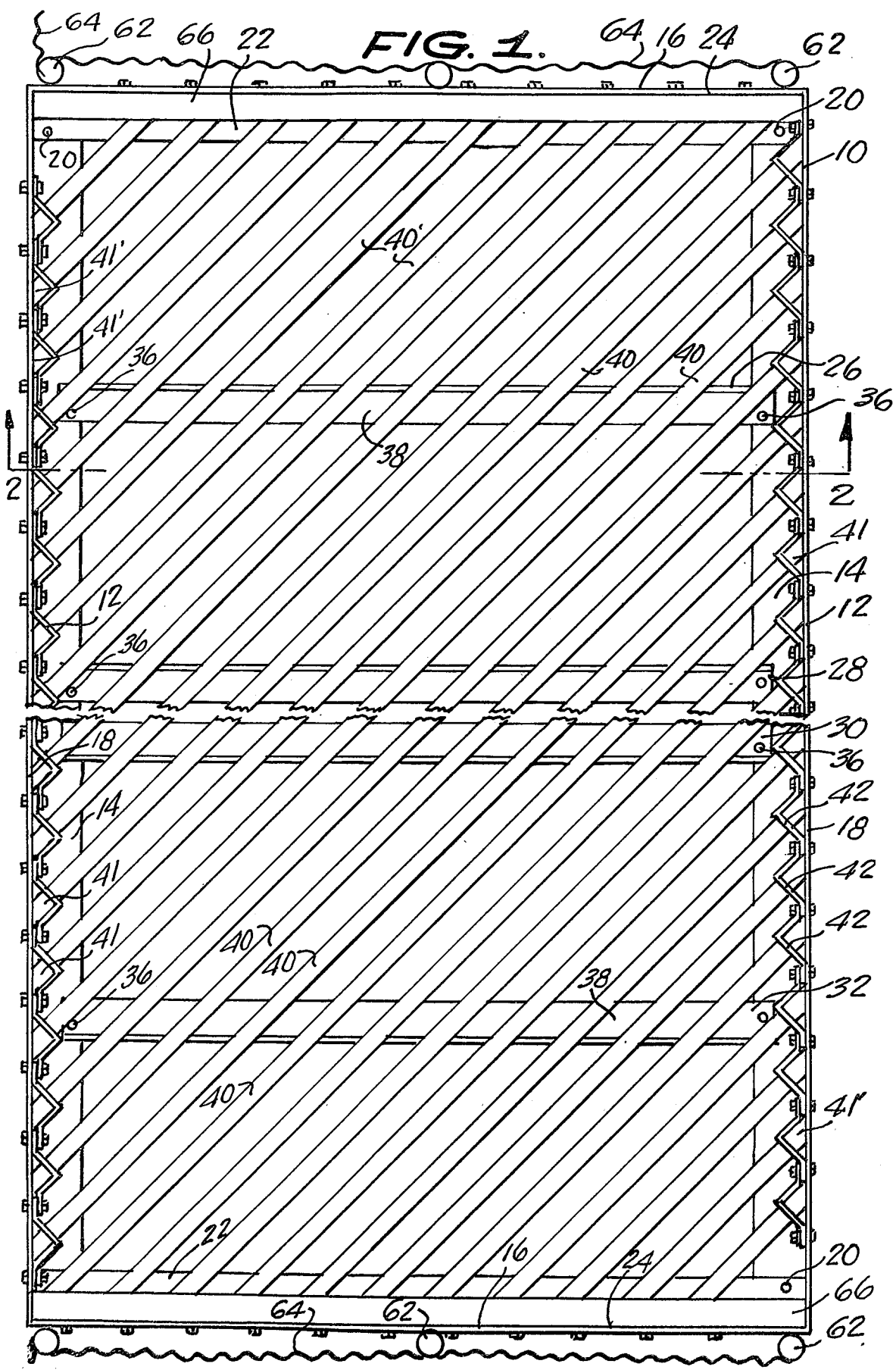

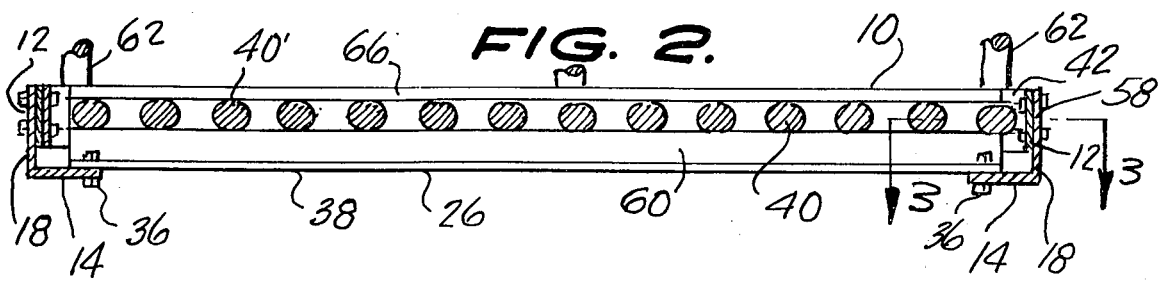
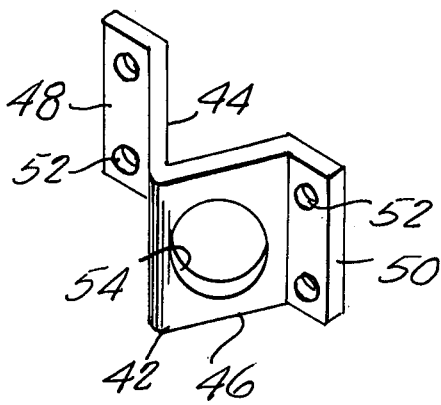
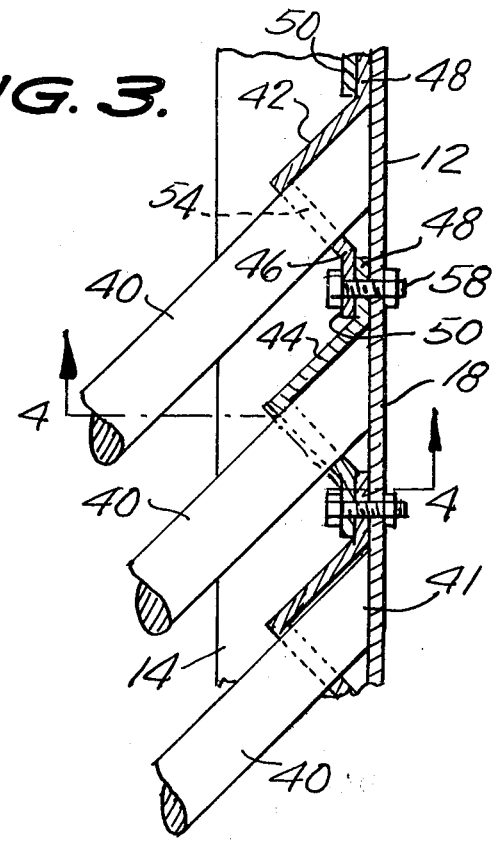
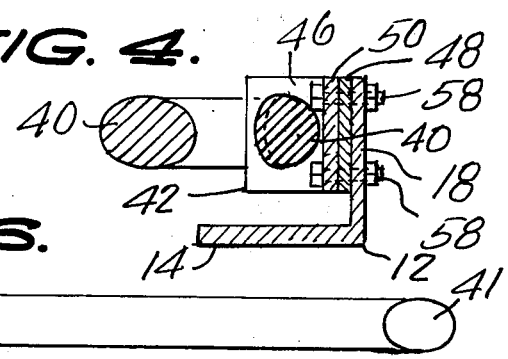
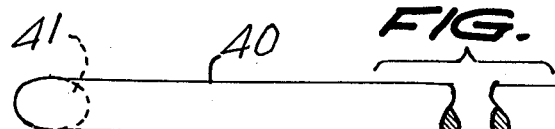
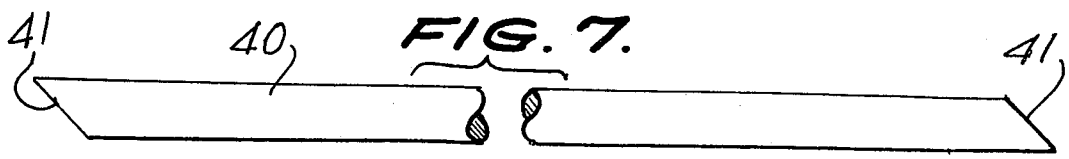

ANIMAL CROSSING GUARD

BACKGROUND OF THE INVENTION

1. Field of the Invention

This invention relates to animal crossing guards which allow vehicular traffic to pass thereover while preventing the passage of clove-hoofed animals.

2. Description of the Prior Art

Welded cattle guards are known, but they are costly and take more time to assemble in location.

Prior known art:

| U.S. Pat. Nos. | 594,148   | 2,535,795 |
|                | 2,592,225 | 2,644,674 |
|                | 3,384,352 |           |

Australian Patent No. 4,052 of September 1926

SUMMARY OF THE INVENTION

An animal crossing guard has a rectangular angle stock frame with longitudinal and end members having lower, horizontal flanges which extend inward. Angle stock braces with short vertical flanges span the frame to keep the longer longitudinal members from spreading and to support a grid of parallel bars which extend across the frame at an angle of 45°. The ends of the bars secured in brackets which have two vertical faces at 90°to each other and two flanges extending therefrom at 135°. On each bracket a face contains a round aperture to receive the end of a bar, the bracket being bolted to the inside of upward extending flanges of the longitudinal and end members of the frame with adjacent bracket flanges overlapping each other.

This construction allows a cattle crossing guard to be quickly and easily assembled on location in any desired size from pre-formed parts. Once the frame is set in place with its braces, pre-cut or cut on location bars are quickly secured in place using the brackets. Since the bracket flanges overlap each other, fewer bolts are required and the brackets can be spaced close to each other to properly position the bars to form a grid. The cattle guard of this invention is stronger, less expensive, and more easily repaired.

BRIEF DESCRIPTION OF THE DRAWING:

FIG. 1 is a top view of a cattle guard according to my invention with a central portion broken away;

FIG. 2 is a vertical section taken on line 2—2 of FIG. 1;

FIG. 3 is an enlarged horizontal section taken on line 3—3 of FIG. 2;

FIG. 4 is a section taken on line 4—4 of FIG. 3;

FIG. 5 is a perspective view of a bracket used in the assembly of the cattle crossing guard;

FIG. 6 is a side view of a bar used to form a grid of the cattle crossing guard; and FIG. 7 is a bottom view of the bar of FIG. 6.

DESCRIPTION OF THE PREFERRED EMBODIMENT

Referring to the Drawing in detail, FIGS. 1–4 show a rectangular frame 10 which is formed by bolting the substantially identical longitudinal members 12 to the substantially identical end members 16. Members 12 and 16 are of an angle stock arranged with the horizontal flanges 14 and 22 of the longitudinal members 12 and the end members 16 disposed inwardly and the vertical flanges 18 and 24 disposed to the outside of the frame 10. The horizontal flanges 22 of the end members 16 are shown placed on and bolted to the horizontal flanges 14 of members 12 by the bolts 20.

As shown in FIGS. 1 and 2, substantially identical transverse angle stock braces 26, 28, 30, and 32 are fixed by bolts 36 on horizontal flanges 22 to extend between the longitudinal members 12. The braces 26, 28, 30, and 32 serve to brace the frame 10 to keep its longitudinal members 12 from being sprung apart and they have the wide horizontal flanges 38 to bed and support frame 10 along with the other horizontal flanges 14 and 22.

A grid of spaced apart bars 40 extend at 45° across the entire frame 10 between the vertical flanges 18 and 24 of members 12 and 16. As may be seen in FIGS. 6 and 7, the bars 40 are cut to suitable lengths with their ends cut of at 45° to have end surfaces 41 parallel to each other. Bars 40' extend between a longitudinal member 12 and an end member 16 and have their ends cut at 45° to have their end surfaces at 90° to each other.

As it may be seen in FIGS. 1, 3, 4 and 5, brackets 42 each have two faces 44 and 46 disposed at 90° to each other. Flanges 48 and 50 containing bolt holes 52 extend from the faces 44 and 46 at angles of substantially 135°. The brackets 42 are oriented with their faces 44 and 46 in a vertical plane and bolted to the flanges 18 and 24 of frame 10 by means of the bolts 58. The flanges 50 of each bracket is placed over the flanges 48 of an adjacent bracket. The faces 46 of the bracket 42 contains round apertures 54 to receive the ends of the bars 40 and 40' before they are bolted in place. The end surfaces 41 and 41' of the bars 40 and 40' butt against the flanges 18 and 24 to prevent rotation of the bars when a vehicle crosses the cattle guard. Since the brackets 42 are bolted in place with one overlapping the next, face 46 may be slightly shorter than face 44 as shown in FIG. 5. The transverse braces 26, 28, 30 and 32 have short horizontal flanges 60 which contact and support intermediate portions of the bars 50 and the longer of the bars 40'.

As may be seen in FIG. 1, posts 62 are welded, bolted or otherwise secured to end members 16 to support barbed wire 64 strung thereon to confine the cattle guard crossing area. Cover plates 66 may be fixed over the ends of bars 40' and their mounting brackets 42 adjacent to the flanges 24 of end members 16 for apearance. While the round bars 40 are described, they could be pipes, tubes, or of any other equivalent material.

While this invention has been described and shown in the best form known, it will nevertheless be understood that this is purely exemplary and that modifications may be made without departing from the spirit and scope of the invention.

I claim:

1. An animal crossing guard allowing the passage of vehicular traffic while preventing the passage of hooved animals thereover comprising, in combination, a rectangular frame having longitudinal and end members with vertical flanges each having a series of bolt holes therealong, brackets each having two faces normal to each other, one of said faces containing an aperture, said brackets each having flanges with each flange extending on an obtuse angle from one of said faces, said flanges each having a bolt hole therethrough, bolts extending through said bolt holes of said flanges and said bolt holes of said vertical flanges of said frame with said brackets being disposed adjacent to each other along said vertical flanges within said frame with said faces of said brackets being in vertical planes, and bars extending between said vertical flanges into the apertures of said bracket faces, said brackets supporting said bars spaced distances apart from and parallel to each other and extending across said frame at an angle to said vertical flanges forming a grid therein.

2. The combination according to claim 1 wherein said bars have ends cut at 45° butting against said vertical flanges of said frame.

3. The combination according to claim 2 wherein said flanges of said brackets are bolted to said vertical flanges of said frame with adjacent bracket flanges overlapping each other.

4. Th combination according to claim 3 wherein said longitudinal and end members of said frame are of angle stock with said longitudinal and end members having said vertical flanges of said frame and having lower horizontal flanges extending inward of said frame.

5. The combination according to claim 4 with the addition of braces bolted on said horizontal flanges of said frame and extending between said longitudinal members, said braces each having a short vertical flange supporting intermediate portions of said bars.

* * * * *